United States Patent
Huang

(10) Patent No.: US 6,572,480 B1
(45) Date of Patent: Jun. 3, 2003

(54) POLYGON UNIVERSAL JOINT

(75) Inventor: Hsin-Hong Huang, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/010,019

(22) Filed: Dec. 5, 2001

(51) Int. Cl.⁷ ................................................. F16D 7/02
(52) U.S. Cl. .................... 464/106; 464/44; 464/185; 192/69.91; 192/108; 403/57; 403/334
(58) Field of Search ................................. 464/106, 155, 464/156, 158, 159, 185, 42, 43, 44; 403/57, 74, 80, 106, 333, 334, 361, 160; 192/70.15, 69.91, 108

(56) References Cited

U.S. PATENT DOCUMENTS

| | | | |
|---|---|---|---|
| 1,286,945 A | 12/1918 | Coates | |
| 1,311,679 A | 7/1919 | Chalifoux | |
| 1,408,789 A | 3/1922 | Whitney et al. | |
| 1,860,762 A | 5/1932 | Wyrick | |
| 3,608,685 A | * 9/1971 | Childress | .................... 192/94 |
| 3,702,639 A | * 11/1972 | Womble et al. | ............. 172/568 |
| 3,940,946 A | 3/1976 | Andersen | |
| 4,034,574 A | * 7/1977 | Kuder | ........................ 464/106 |
| 4,080,079 A | 3/1978 | Waara | |
| 4,772,246 A | 9/1988 | Wenzel | |
| 5,069,569 A | 12/1991 | Lieser | |
| 5,738,586 A | 4/1998 | Arriaga | |
| 5,860,864 A | 1/1999 | Vukovic | |

* cited by examiner

Primary Examiner—Lynne H. Browne
Assistant Examiner—Kenn Thompson
(74) Attorney, Agent, or Firm—Brinks Hofer Gilson & Lione

(57) ABSTRACT

A universal joint adapted to interconnect a pair of rotating shafts at an angle relative to one another including a first member and a second member wherein the first member has a first longitudinal axis and includes an elongated semi-spherical head having a plurality of circumferentially spaced and radially outward facing facets which are curved along the first longitudinal axis and the second member has a second longitudinal axis and includes a pocket adapted to receive the elongated head. The pocket further includes a plurality of circumferentially spaced and radially inward facing facets which correspond to the plurality of radially outward facing facets on the elongated head and are tapered relative to the second longitudinal axis.

14 Claims, 2 Drawing Sheets

POLYGON UNIVERSAL JOINT

TECHNICAL FIELD OF THE INVENTION

The present invention generally relates to a universal joint adapted to interconnect two rotating shafts positioned at an angle relative to one another. Specifically, the present invention is a universal joint adapted to allow rotational movement to be transferred between two shaft which are at an angle relative to one another for low torque and low speed applications such as a steering column.

BACKGROUND OF THE INVENTION

Many universal joints exist which are adapted to transfer rotational movement from an input shaft to an output shaft. The purpose of a universal joint is to allow this rotational movement to be transferred when the input shaft is positioned at some angle relative to the output shaft. Traditional universal joints use a pair of yokes attached to each other with a cross member. Needle bearings located within ball caps supported by the yokes provide flexibility in transmitting rotational motion between the yokes when the yokes are at an angle to each other. This type of universal joint is ideal for high torque and high RPM applications. Examples of such devices include propeller shafts used in front engine, rear wheel drive motor vehicles. However, in some applications, such as with a steering column of a motor vehicle, it is not necessary for the universal joint to be robust enough to withstand high torque and high RPMs. In steering column applications it is desired to connect the steering wheel to the steering gear box. Due to packaging and crash protection issues, those components are generally not aligned.

Universal joints for low torque, low RPM applications have also been developed. One such method involves the use of a head and pocket arrangement wherein the head has a plurality of facets facing radially outward and the pocket has a corresponding plurality of facets facing radially inward. In this type of application, the head is mounted to one of the shafts and is rounded to allow that shaft to tilt relative to the pocket. The meshing engagement of the outwardly facing sides of the head and the inwardly facing sides of the pocket allow rotation movement to be transferred from one shaft to the other similarly to a pair of meshing gears. One problem with such an arrangement is that due to the friction between the head and the pocket, the sides of each will wear with time. As these surfaces wear, there will be less frictional engagement. Ultimately, the head and pocket will wear to a point where there is an unacceptable play or dead-land between the input shaft and the output shaft. Therefore, there is a need for an improved universal joint which will accommodate wear to the head and pocket to maintain solid engagement between the head and the pocket as the head and pocket wear with time.

DETAILED DESCRIPTION OF THE PREFERRED EMBODIMENT

The following description of the preferred embodiment of the invention is not intended to limit the scope of the invention to this preferred embodiment, but rather to enable any person skilled in the art to make and use the invention.

Figure 1:
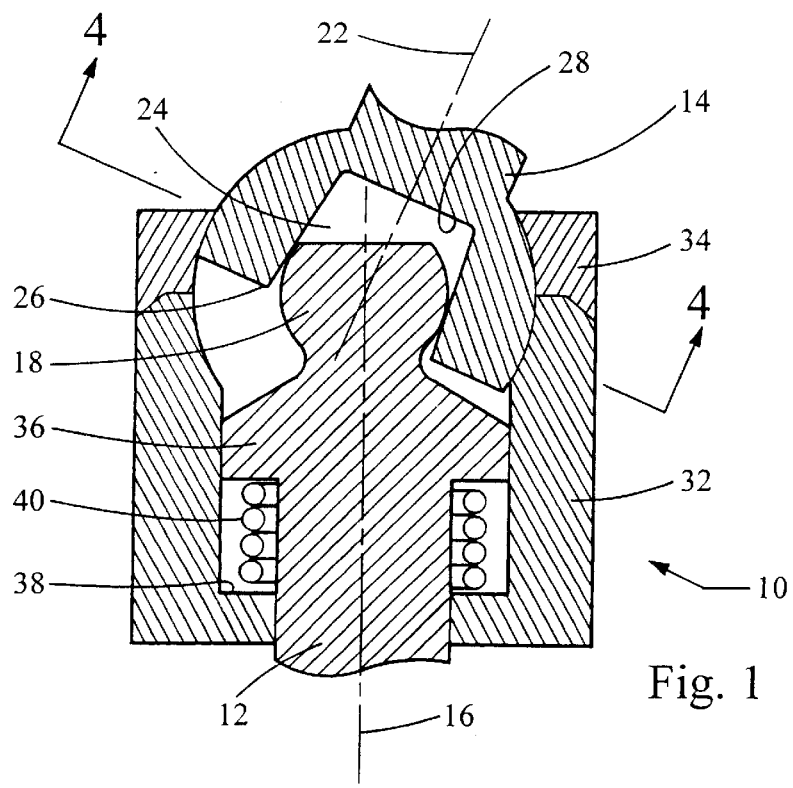
FIG. 1 is a sectional view of a universal joint of the present invention.
Figure 3:
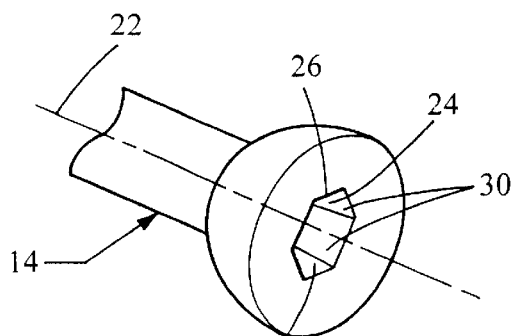
FIG. 3 is a perspective view of a second member of the universal joint of FIG. 1 having a pocket adapted to receive the elongated head shown in FIG. 2.
Figure 2:
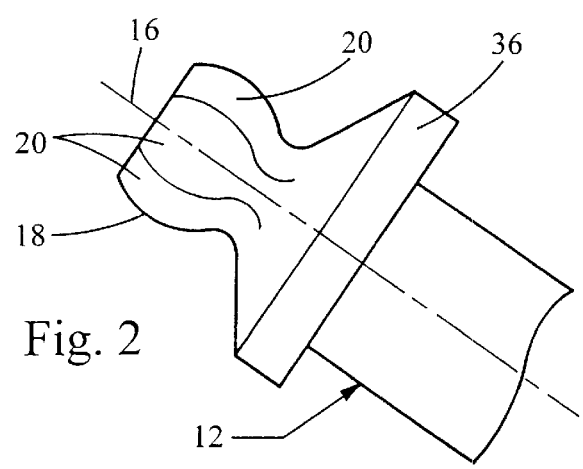
FIG. 2 is a perspective view of a first member of the universal joint of FIG. 1 having an elongated semi-spherical head.

Referring to FIGS. 1 through 3, a universal joint adapted to interconnect a pair of rotating shafts at an angle relative to one another is shown generally at 10. The universal joint 10 includes a first member 12 and a second member 14. The first and second members 12, 14 are preferably made from a metal. In the preferred embodiment, the first and second members 12, 14 are made from mild carbon steel with a hardness of 55 to 65 on the Rockwell C scale. Referring to FIGS. 1 and 2, the first member 12 has a first longitudinal axis 16 and includes an elongated semi-spherical head 18 having a plurality of circumferentially spaced and radially outward facing facets 20 which are curved along the first longitudinal axis 16.

Referring to FIG. 3, the second member 14 has a second longitudinal axis 22 and includes a pocket 24 which is adapted to receive the elongated head 18 of the first member 12. The pocket 24 is formed within the second member 14 and includes an opening 26 and a bottom 28. The pocket 24 further includes a plurality of circumferentially spaced and radially inward facing facets 30 which correspond to the plurality of radially outward facing facets 20 on the elongated head 18. The radially inward facing facets 30 extend between the opening 26 and the bottom 28, thereby defining the multiple sided pocket 24.

Referring to FIG. 1, when the elongated head 18 of the first member 12 is inserted within the pocket 24, the facets 30 and 20 engage which prevents the head 18 and the pocket 24 from being able to rotate relative to one another. The elongated head 18 and the facets 30 within the pocket 24 will allow rotational movement to be transferred between the first member 12 and the second member 14 when the first axis 16 is at an angle to the second axis 22.

The elongated head 18 includes between five and ten circumferentially spaced and radially outward facing facets 20 and the pocket 24 includes a corresponding number of circumferentially spaced and radially inward facing facets 30. The number of facets 20, 30 depends upon the particular application. The fewer the facets 20, 30, then the larger the facets 20, 30 will be, and the smaller the relative angle will be between the facets 20, 30. This will provide angular contact between the inwardly facing facets 30 and the outwardly facing facets 20. As the number of facets 20, 30 increases, the relative angle between the facets 20, 30 increases such that the angular contact between the facets 20, 30 is at a shallow angle. Therefore, the number of facets 20, 30 determines how much torque and speed the universal joint 10 can withstand. The fewer the number of facets 20, 30, the more torque that the universal joint 10 Will be able to withstand, but the noisier the universal joint 10 will be. The higher the number of facets 20, 30, the lower the torque, but the quieter the universal joint 10 will operate. In the preferred embodiment, the elongated head 18 and the pocket 24 each have six circumferentially spaced facets 20, 30.

The outwardly facing facets 20 on the elongated head 18 of the first member 12 are curved along the first axis 16. This allows the first member 12 to be angled with respect to the second member 14 while maintaining substantially the same area of frictional contact between the facets 20 of the elongated head 18 and the facets 30 of the pocket 24. This allows rotational movement to be transferred between the first member 12 and the second member 14 when the first and second members 12, 14 are at an angle to each other.

Figure 4:
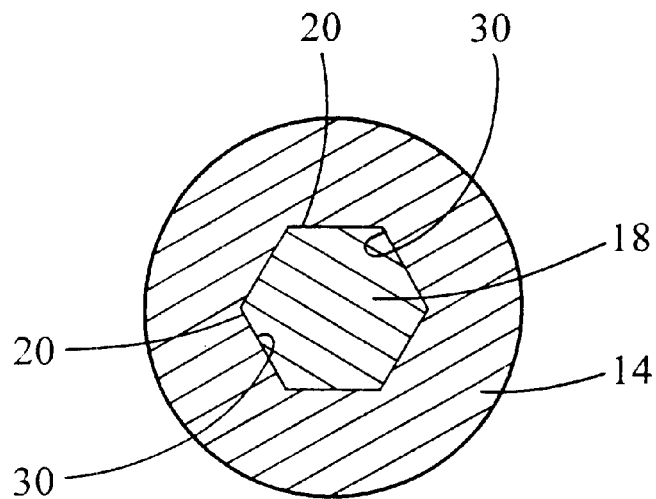
FIG. 4 is a cross section view taken along line 4—4 of FIG. 1.
Figure 5:
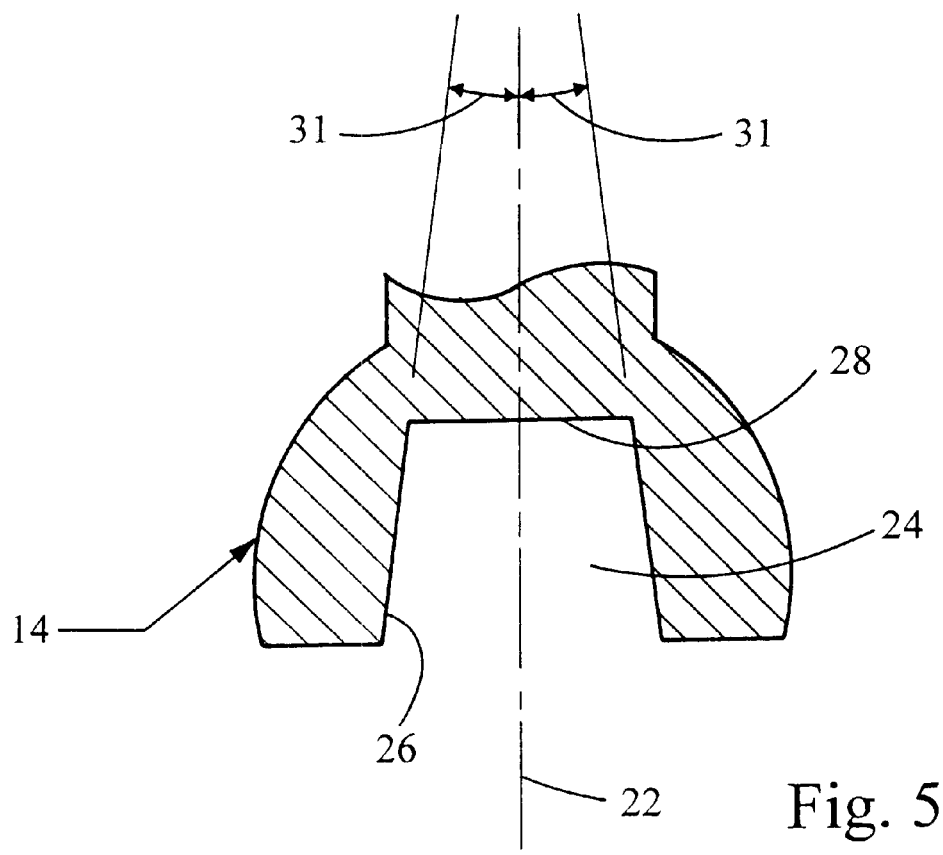
FIG. 5 is a cross sectional view of the pocket.

Referring to FIG. 5, the facets 30 within the pocket 24 are tapered at an angle 31 to the second longitudinal axis 22 giving the pocket 24 a conical profile such that the pocket 24 becomes larger as the radially inward facing facets 30 extend from the bottom 28 to the opening 26. Referring to FIG. 4, the elongated head 18 of the first member 12 fits within the opening 26 of the pocket 24 and will slide downward toward the bottom 28 until the cross sectional area of the pocket 24 is substantially the same as the cross sectional area of the elongated head 18, wherein the inwardly facing facets 30 of the pocket 24 will come into contact with the outwardly facing facets 20 of the elongated head 18.

Referring again to FIG. 1, the universal joint 10 further includes a first housing section 32 which is adapted to support the first member 12 and a second housing section 34 which is adapted to support the second member. The first and second housing sections 32, 34 are adapted to be attached to one another thereby securing the elongated head 18 of the first member 12 in engagement with the pocket 24 of the second member 14. Preferably, the first and second housing sections 32, 34 are made from a strong but lightweight material such as plastic or aluminum.

The first housing section 32 is adapted to allow longitudinal movement of the first member 12. This allows the first member to slide back and forth and allows the elongated head 18 to move back and forth within the pocket 24. The second housing section 34 holds the second member 14 such that no longitudinal movement of the second member 14 is permitted, however, the second housing section 34 is adapted to allow pivotal movement of the second member 14.

In the preferred embodiment, the first member 12 includes a radial flange 36 and the first housing section 32 includes a support surface 38. When the universal joint 10 is assembled, a spring 40 is placed between the radial flange 36 and the support surface 38 to bias the first member 12 longitudinally away from the support surface 38. The spring 40 will act to keep a biasing force on the first member to keep the first member fully engaged with the second member. This will prevent backlash from occurring within the universal joint 10.

Additionally, the spring 40 will maintain solid engagement between the elongated head 18 and the pocket 24 as the elongated head 18 and the pocket 24 wear. Over time, the corners formed where the circumferentially spaced facets 20 of the elongated head 18 meet will wear down due to friction with the internally facing facets 30 of the pocket 24. The cross sectional size of the elongated head 18 will wear to a smaller size, and the cross sectional size of the pocket 24 will wear to a larger size until eventually there will be play between the head 18 and the pocket 24.

The strength of the spring 40 used is important. The spring 40 must exert enough force on the first member 12 to provide sufficient bias of the first member 12, however, the force of the spring 40 must not be too much, whereby friction between the first and second members 12, 14 and the first and second housing sections 32, 34 prevents smooth rotational movement of the first and second members 12, 14. In order to function properly, the second member 14 must be able to smoothly pivot and rotate within the second housing section 34.

One significant advantage of the present invention is that the tapered facets 30 of the pocket 24 provide a cross sectional pocket size which becomes gradually smaller from the opening 26 toward the bottom 28 of the pocket 24. As the elongated head 18 and the pocket 24 wear, the spring 40 will force the elongated head further into the pocket 24 to a point where the pocket 24 has not sustained any wear and the cross sectional size of the smaller elongated head 18 is substantially the same as the cross sectional size of the pocket 24. Therefore, as the elongated head 18 and the pocket 24 experience wear over time, the tapered profile of the pocket 24 and the spring 40 which biases the elongated head 18 into the pocket 24 will allow the universal joint 10 to accommodate some wear over time while preserving the performance of the universal joint 10.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

I claim:

1. A universal joint adapted to interconnect a pair of rotating shafts at an angle relative to one another comprising:

a first member having a first longitudinal axis and including an elongated semi-spherical head having a plurality of circumferentially spaced and radially outward facing facets which are curved along said first longitudinal axis;

a second member having a second longitudinal axis and including a pocket adapted to receive said elongated head, said pocket having a plurality of circumferentially spaced and radially inward facing facets corresponding to said plurality of radially outward facing facets on said elongated head and being tapered relative to said second longitudinal axis;

one of said first member and said second member being biased to maintain engagement between said first member and said second member.

2. The universal joint of claim 1 wherein one of said first member and said second member is longitudinally spring loaded.

3. The universal joint of claim 1 wherein said elongated head includes between five and ten circumferentially spaced and radially outward facing facets and said pocket includes a corresponding number of circumferentially spaced and radially inward facing facets.

4. The universal joint of claim 3 wherein said elongated head includes six circumferentially spaced and radially outward facing facets and said pocket includes six corresponding circumferentially spaced and radially inward facing facets.

5. The universal joint of claim 1 further including a first housing section adapted to support said first member and a second housing section adapted to support said second member and to be secured to said first housing section, thereby securing said elongated head within said pocket.

6. The universal joint of claim 5 wherein said first housing section is adapted to allow longitudinal movement of said first member and said second housing section is adapted to allow pivotal movement of said second member.

7. The universal joint of claim 6 wherein said first member includes a radial flange and said first housing section includes a support surface wherein said universal joint includes a spring located between said flange and said support surface which is adapted to bias said first member outward from said support surface.

8. The universal joint of claim 1 wherein said first member and said second member are formed from metal.

9. The universal joint of claim 8 wherein said first member and said second member are formed from plain carbon steel with a Rockwell C hardness of between about 55 and about 65.

10. A universal joint adapted to interconnect a pair of rotating shafts at an angle relative to one another comprising:

- a first member having a first longitudinal axis and including an elongated semi-spherical head having a plurality of circumferentially spaced and radially outward facing facets which are curved along said first longitudinal axis; and
- a second member having a second longitudinal axis and including a pocket adapted to receive said elongated head and having a plurality of circumferentially spaced and radially inward facing facets corresponding to said plurality of radially outward facing facets on said elongated head and being tapered relative to said second longitudinal axis;
- a first housing section adapted to support said first member and to allow longitudinal movement of said first member within said first housing section;
- a second housing section adapted to support said second member, allow pivotal movement of said second member within said second housing section and to be secured to said first housing section, thereby securing said elongated head within said pocket;
- said first member including a radial flange and said first housing section including a support surface and a spring located between said flange and said support surface which is adapted to bias said first member outward from said support surface.

11. The universal joint of claim 10 wherein said elongated head includes between five and ten circumferentially spaced and radially outward facing facets and said pocket includes a corresponding number of circumferentially spaced and radially inward facing facets.

12. The universal joint of claim 11 wherein said elongated head includes six circumferentially spaced and radially outward facing facets and said pocket includes six corresponding circumferentially spaced and radially inward facing facets.

13. The universal joint of claim 10 wherein said first member and said second member are formed from metal.

14. The universal joint of claim 13 wherein said first member and said second member are formed from plain carbon steel with a Rockwell C hardness of between about 55 and about 65.

* * * * *